United States Patent
Srinivasan

(10) Patent No.: US 12,415,296 B2
(45) Date of Patent: Sep. 16, 2025

(54) CNC WIRE CUTTING MACHINE

(71) Applicant: Viswesh Srinivasan, Chennai (IN)

(72) Inventor: Viswesh Srinivasan, Chennai (IN)

( * ) Notice: Subject to any disclaimer, the term of this patent is extended or adjusted under 35 U.S.C. 154(b) by 100 days.

(21) Appl. No.: 18/041,967

(22) PCT Filed: Aug. 16, 2021

(86) PCT No.: PCT/IN2021/050786
§ 371 (c)(1),
(2) Date: Feb. 16, 2023

(87) PCT Pub. No.: WO2022/038634
PCT Pub. Date: Feb. 24, 2022

(65) Prior Publication Data
US 2024/0308107 A1 Sep. 19, 2024

(51) Int. Cl.
*B28D 5/04* (2006.01)
*B28D 5/00* (2006.01)

(52) U.S. Cl.
CPC ........... *B28D 5/045* (2013.01); *B28D 5/0064* (2013.01)

(58) Field of Classification Search
CPC .............................. B28D 5/0064; B28D 5/045
See application file for complete search history.

(56) References Cited

U.S. PATENT DOCUMENTS

| | | | | |
|---|---|---|---|---|
| 3,831,576 | A * | 8/1974 | Mech | B26D 1/547 125/21 |
| 5,829,424 | A * | 11/1998 | Hauser | B65H 54/2896 125/16.02 |
| 5,878,737 | A * | 3/1999 | Hodsden | B28D 5/0082 125/16.02 |
| 6,145,499 | A * | 11/2000 | Tsuchishima | B28D 5/0076 125/35 |
| 9,427,888 | B2 * | 8/2016 | Wiesner | B28D 1/08 |
| 2012/0298090 | A1 * | 11/2012 | Ohya | B24B 27/0633 125/16.02 |
| 2014/0144420 | A1 * | 5/2014 | Wiesner | B28D 1/08 125/16.02 |
| 2017/0136655 | A1 * | 5/2017 | Jeronimo | B28D 5/045 |
| 2018/0326590 | A1 * | 11/2018 | Masuda | B25J 15/04 |
| 2019/0193175 | A1 * | 6/2019 | Huggenberger | B28D 5/045 |
| 2020/0316817 | A1 * | 10/2020 | Rieger | B23D 57/0053 |

* cited by examiner

*Primary Examiner* — Sean M Michalski

(57) ABSTRACT

In CNC wire cutting process, the deflection of the wire due to cutting force is proportional to square of the wire length. Hence it is beneficial to adjust wire length as per job size and keep it minimal. But existing wire cutting machines, wire length adjustment is not feasible. Hence there is a need to develop a simple user-friendly method of wire length adjustment. This invention proposes a simple user-friendly method of wire length adjustment in abrasive wire (100A) and hot wire cutting (100B) machines. This invention also proposes an intelligent faster cutting method without affecting wire life or pulley life. This invention also proposes an intelligent method of start point selection in CNC wire cutting machines, to avoid part defects.

13 Claims, 6 Drawing Sheets

Fig.2 Shortened wire position 201 (L2)

Fig.2 Shortened wire position

CNC WIRE CUTTING MACHINE

TECHNICAL FIELD

Conventional abrasive wire cutting machines have 4 pulleys (one driving and 3 idler) as shown in FIG. 1. Typically pipe sections which are 1.2 meter long has to be cut on the machine. Hence a cutting wire length longer than 1.2 m is usually maintained. However, deflection of the wire due to cutting force is proportional to square of the wire length, hence it is beneficial to keep the wire length as short as possible. Hence there is a need for the wire length to be adjustable in abrasive wire cutting machine. This invention proposes a novel method by which wire length can be easily adjusted by the user. This invention also proposes method to increase cutting speed in the wire cutting machine without affecting the pulley or the wire life.

BACKGROUND OF INVENTION

In CNC wire cutting process, the deflection of the wire due to cutting force is proportional to square of the wire length. Hence it is beneficial to adjust wire length as per job size and keep it minimal. But existing wire cutting machines, wire length adjustment is not feasible. Hence there is a need to develop a simple user friendly method of wire length adjustment.

Also in pulley driven wire cutting machines, excessive wire deflection can cause the wire to touch the rim of the pulley which reduces wire life and pulley rubber coating life. Hence there is a need to develop an intelligent faster cutting method without affecting pulley or wire life.

SUMMARY

The principal object of this invention is to develop a simple user friendly method of wire length adjustment in abrasive wire, hot wire and other wire cutting machines.

Another objective of this invention is to develop an intelligent faster cutting method without affecting pulley or wire life.

These and other objects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF FIGURES

This invention is illustrated in the accompanying drawings, throughout which like reference letters indicate corresponding parts in the various figures. The embodiments herein will be better understood from the following description with reference to the drawings, in which:

FIG. 3 5th pulley attachment to reduce wire length.

DETAILED DESCRIPTION OF INVENTION

Figure 1:
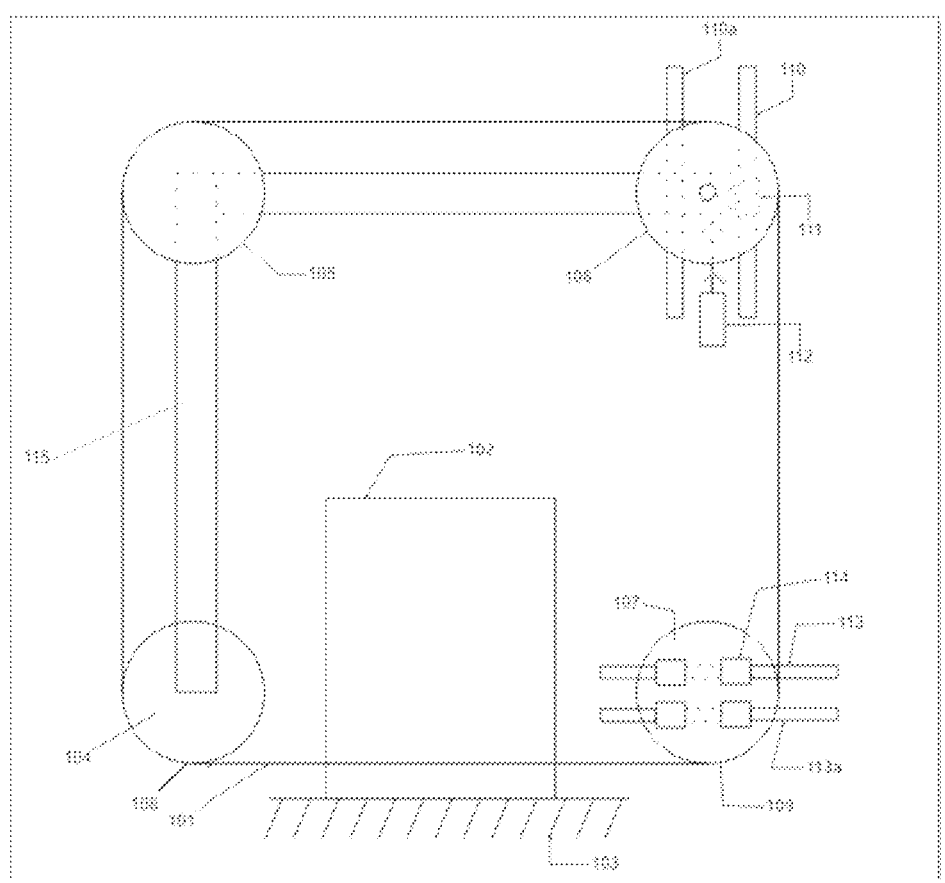
FIG. 1 Proposed wire length adjustment mechanism in Abrasive wire machine.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. For example, it should be noted that while some embodiments are explained with respect to abrasive wire cutting machine, any other application may also incorporate the subject matter of the invention with little or no modifications. Accordingly, the examples should not be construed as limiting the scope of the embodiments herein.

The embodiments herein describe an innovative method of cutting wire length adjustment in CNC wire cutting process. Referring now to the drawings, and more particularly to FIGS. 1 through 12, where similar reference characters denote corresponding features consistently throughout the figures, there are shown embodiments.

In CNC wire cutting system (100), a wire is typically held in tension and used to cut a raw material. There are several types of CNC wire cutting system depending on how the wire is given energy to cut the material. Some such known Industrial systems are Abrasive wire cutting machine (100A), Hot-wire cutting machine (100B), EDM (Electric Discharge Machining) wire cut machine (100C) etc.

FIG. 1 shows a 4-pulley abrasive wire system (100A), consisting of cutting wire (101), cutting a block (102) resting on ground (103). It consists of 4 pulleys: Bottom Left pulley (104), Top Left pulley (105), Top Right pulley (106), Bottom Right pulley (107). All pulleys are fixed on a common frame 115.

Effective unsupported length of the cutting wire is between the bottom point (108) of pulley (104) and bottom point (109) of pulley (107).

Typically, the pulley (106) is having a floating arrangement, with LM rail (110) rigidly fixed to frame (115) and LM blocks (111) moving on the LM rail. A pneumatic or electric actuator (112) is pushing the pulley (106) up (typically through a spring), to maintain tension in the wire.

In this invention, it is proposed to mount the Bottom Right pulley 107 on a horizontal, movable attachment, consisting of: LM blocks 114 (rigidly fixed to the frame 115), in which LM rails 113, 113 A is free to slide. The pulley 107 is in turn mounted on a plate 116, which is rigidly attached to LM rails 113, 113 A.

Normally the plate 116 and rails 113 is locked to the frame 115 using fasteners 117.

When effective cutting wire length needs to be reduced, the fasteners 117 is loosened, the LM rails 113, 113 A is moved to the left along with pulley 107. Then the plate 116 is again locked to frame 115 using fasteners 117. The adjusted position is as shown in FIG. 2.

The sliding motion of 113, 113A can optionally be motorized.

Figure 2:
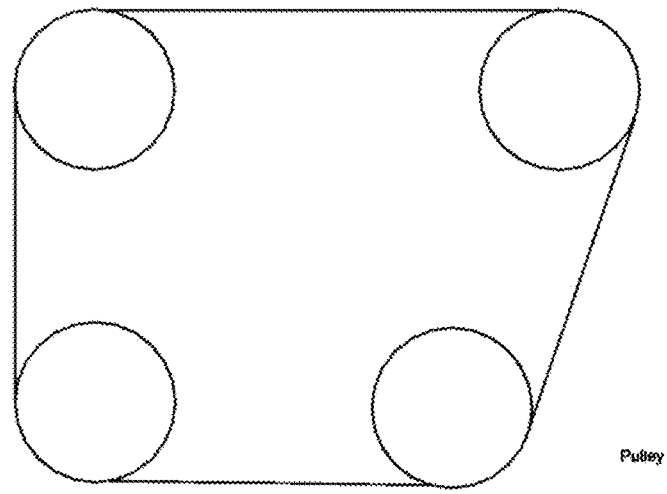
FIG. 2 Shortened cutting wire length position of the machine.

As seen in FIG. 2, the effective cutting wire length is reduced to L2 (201). To keep the wire in tension, the Top Right pulley 106 is pushed up further as shown in FIG. 2.

In another embodiment, a shorter cutting wire (101A) can be used, to avoid pushing up the 106 pulley excessively.

In another embodiment, the pulley 104 can have horizontal sliding feature.

In another embodiment, the pulley 105 can have vertical sliding feature.

In another embodiment, the pulley 105, 106 can have horizontal sliding feature.

Figure 3:
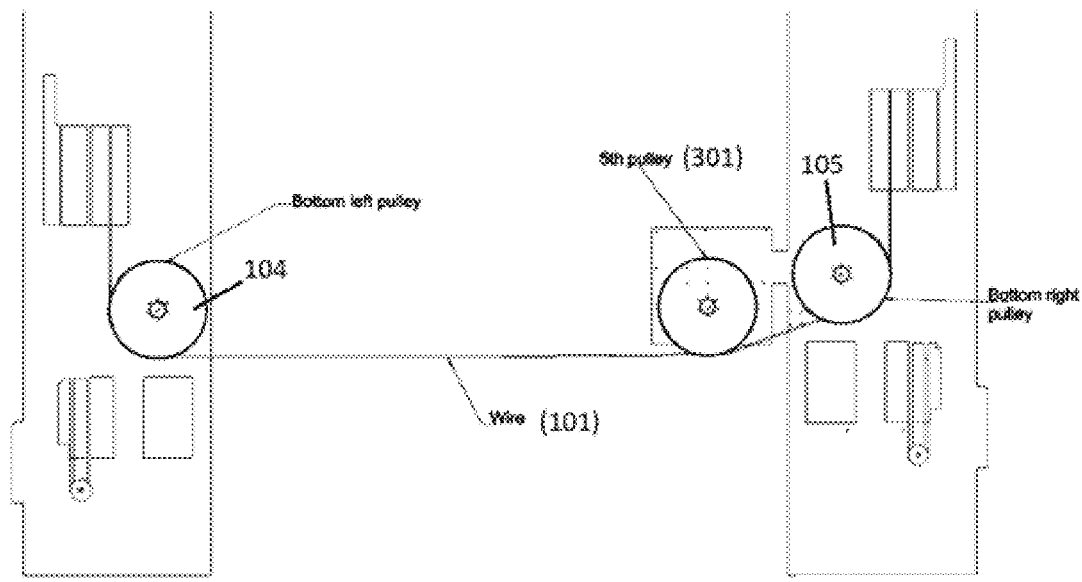

In another embodiment, a fifth pulley 301 can be optionally added to the system as shown in FIG. 3, to reduce effective cutting length.

Figure 4:
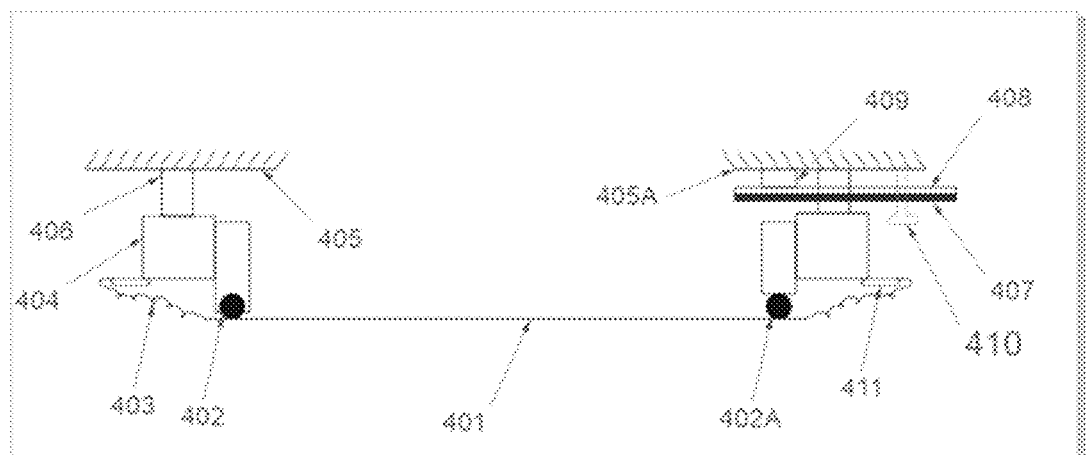
FIG. 4: variable width hot wire cutter.

FIG. 4 shows a CNC hotwire cutting machine (400). (401) is a heating element wire like Nichrome etc. (401) is resting on two threaded/grooved rods (402, 402A) and held in tension by the springs (403, 403A) which in turn is attached to plates (411, 411A).

Multiple such wires are positioned between the grooved rods for multi-wire cutting.

The threaded rod (402, 402A) and the plates (411, 411A) are in turn attached to beams (404, 404A) respectively.

Typically beam (404) is attached to plate 405, through an optional plate (406). Plate (405) is in turn attached to Y-axis of a XY CNC system, which moves the wire along programmed path to cut required shapes in foam.

But in this traditional setup, the wire length between 402, 402A is fixed and not adjustable. However, when cutting small length jobs, it is beneficial to cut with small length wire, to increase cutting speed.

In this invention, it is proposed to fix at least one of 404 or 404A on a plate 407 which is fixed to LM (Linear Motion) rails 408. The LM rails 408 are free to slide on the LM blocks 409. The LM blocks are in turn fixed to the plate 405A, which is locked to Y-axis of XY CNC machine.

Plates 407 and 405A are locked together by fasteners 410.

When cutting wire length should be reduced, the fastener 410 is loosened, and the LM rail 408 is slid to the left, to bring 402A closer to 402. After sliding left, the plates 407 and 405A are locked together again by fastener 410.

The sliding motion of 408 can optionally be motorized.

FIG. 1 shows a 4-pulley abrasive wire system, consisting of cutting wire 101, cutting a block 102 resting on ground 103. It consists of 4 pulleys: Bottom Left pulley (104), Top Left pulley (105), Top Right pulley (106), Bottom Right pulley (107). All pulleys are fixed on a common frame 115.

The wire 101 between the pulleys tends to deflect due to the cutting force.

Figure 5:
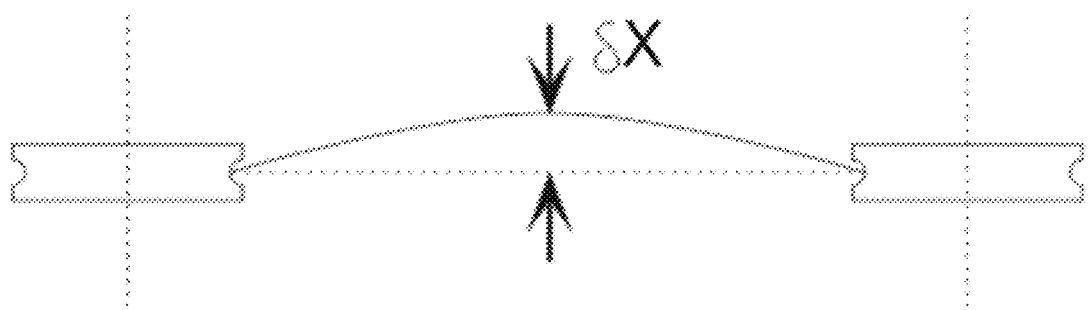
FIG. 5: Wire deflection in X direction

FIG. 5 top shows the wire deflection in X direction.

Figure 6:
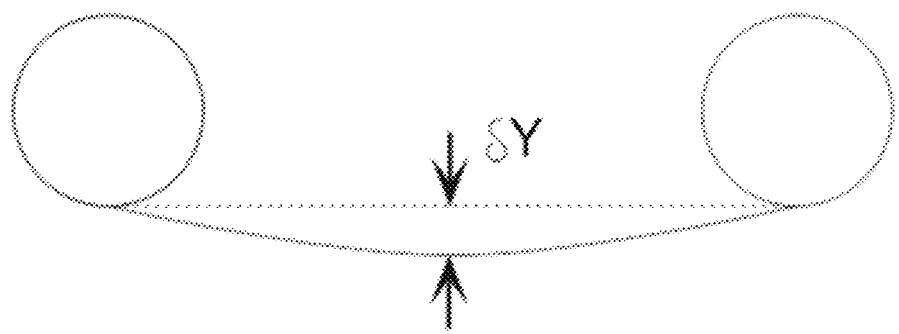
FIG. 6. Wire deflection in Y direction

FIG. 6 bottom shows the cutting wire deflection in Y direction.

Deflection of wire in X direction causes the wire to touch the rim of the pulley, causing relative motion between the pulley and the wire, resulting in damage to the pulley and the wire.

Also, the X direction deflection tends to pull the wire out of the pulley groove. Hence deflection in X direction must be kept minimal.

But deflection in Y direction does not cause the above two problems. Hence a higher wire deflection can be tolerated in the Y direction, thus allowing user to cut faster in the Y direction.

This invention proposes an automatic method of cutting speed selection, based on the current direction of cut.

During CNC wire cutting, the wire may move in any X Y direction, causing the wire to deflect in both X and Y direction.

For example, say allowed deflection in X axis is 5 mm (defX) and allowed deflection in Y axis is 10 mm (defY). This results in an allowed feed rate of say 250 mm per minute (Fx) in X axis and 500 mm per minute (Fy) in Y axis.

Figure 7:
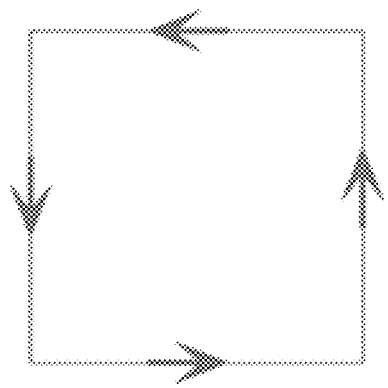
FIG. 7. Square cutting path

FIG. 7 shows the machine cutting a square shape. The two horizontal edges are cut at Fx feed rate and two vertical edges can be cut at Fy feed rate.

Figure 8:
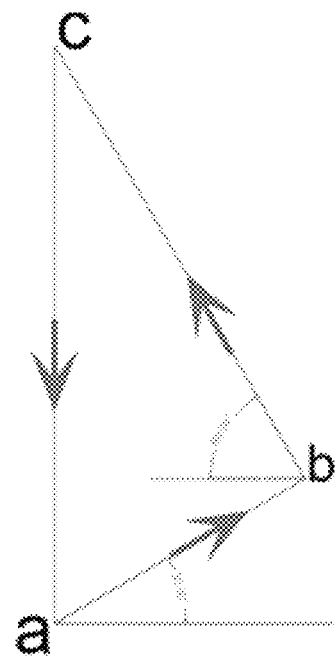
FIG. 8. Angled cutting path.

FIG. 8 shows a geometry where edge1 (ab) is at angle 30 degrees (theeta) to X axis and edge2 (bc) is at 60 degrees to X axis. The allowed cutting feed rate along the edge is calculated as follows: F1=Fx/cos(theeta), F1=Fy/sin(theeta). Chosen feed rate along the path Fpath=min(F1, F2).

Thus, feed rate is calculated for each line of the path G code using the above formulae.

Figure 9:
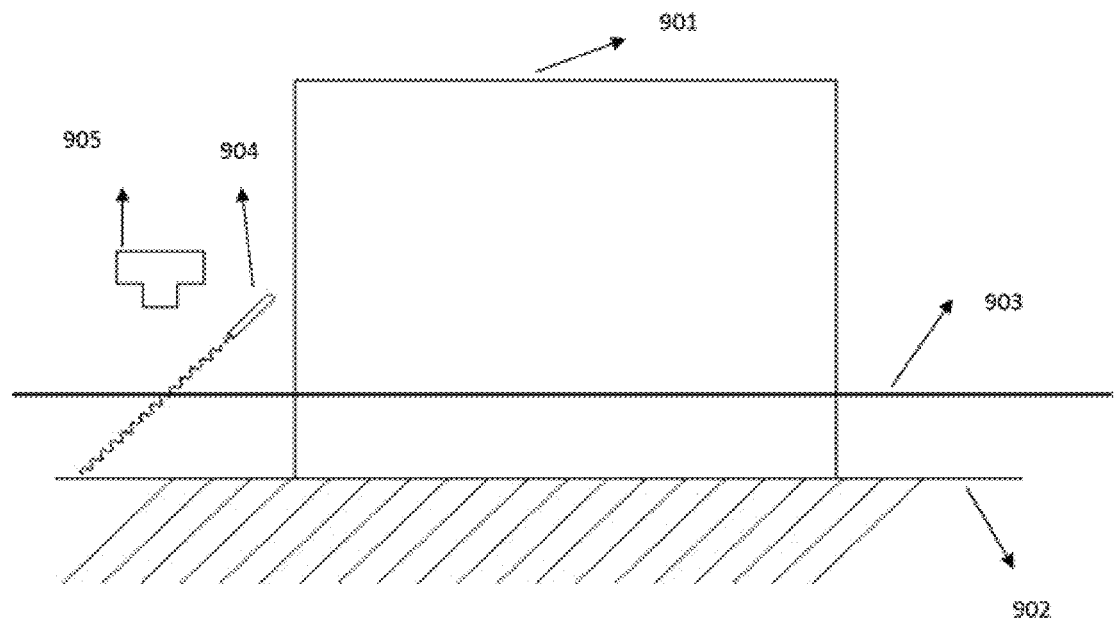
FIG. 9: Wire lag sensor

In another embodiment, sensors are mounted on the machine to measure the wire deflection. FIG. 9 shows a sensor 906 consisting of Line laser 904 and camera 905, viewing down on the wire 903, thus detecting deflection of the wire in 360 deg.

The feed rate is automatically adjusted based on the measured deflection.

In such an automatic feed rate control method, user is allowed to set maximum allowed deflection value independently for X and Y. Control is done accordingly based on this user input, thus achieving overall higher cutting speeds and hence higher productivity from the machine.

Automatic federate control is proposed in this invention, where feed forward information of the path is used to cut faster in the long move zones, between sharp corners. Normally feedback control is used, where is speed is adjusted proportional to the lag value. But this will reduce the federate only after the lag has started. But since information of the path being cut is known to the CNC controller ahead of time, it can use this information in a feed-forward control mode and start slowing down, when the machine approaching a corner. Such a control will result in perfect defect free geometries, as tool/wire is always well controlled.

Automatic federate control is proposed in this invention, where machine dwells at the corner, till lag is within allowed range, where the tool lag is sensed by a sensor. In existing CNC machines, the dwell time is pre-programmed to a static value. In this case, when the tool/wire was not lagging and still dwell is programmed, the tool ends up cutting extra material at the corner. Hence this invention proposes a closed loop dwell time control, where the tool lag is monitored by the sensor (906) and dwell time is decided based on the lag status. This results in perfect defect free corner geometries.

The wire deflection sensor described in Indian patent number 202047011470 fig 9, (using Line LASER and camera), can also be used for detecting wire vibration, based on LASER beam spot size seen by the camera. Direction of vibration can also be estimated based on the direction of elongation of the spot size. Normally when wire is not vibrating, the spot size of the Line LASER falling on the wire (903) as seen by the camera (905) will be small, but when the wire is vibrating at high frequency, the spot size seen by the camera (905) will be elongated due to persistence of vision, which can be detected by the camera (905).

When cutting foam with hot knife, the tip of the knife tends to vibrate. During plunging into the sheet, this vibration can cause the knife to penetrate the sheet at an angle. Hence, it is required to have a mechanical vibration arrester constriction near the tip of the knife, in Z up position.

However, after cutting foam, when Z up raises, molten EPS falls on this constriction and the knife tip can get glued to this.

This gluing is very strong and if the knife is moved down now, it buckles and breaks the knife.

In one embodiment, the restrictor is motorised, where two V clamp jaws engage and disengage when needed. Either one or both the jaws are moved by the motorised arrangement. Such a Vclamp, can also precisely hold the knife tip, centered to the base of the knife, without any deflection.

In another embodiment, the restrictor is mounted on dis-engageable magnets, with two locating magnets and also with magnetic reed switch. If the knife tip is glued, when moving down, then the magnets will disengage and this will be detected by the magnetic reed switch and the machine will stop. Such an arrangement prevents damage to the cutting knife.

Figure 10:
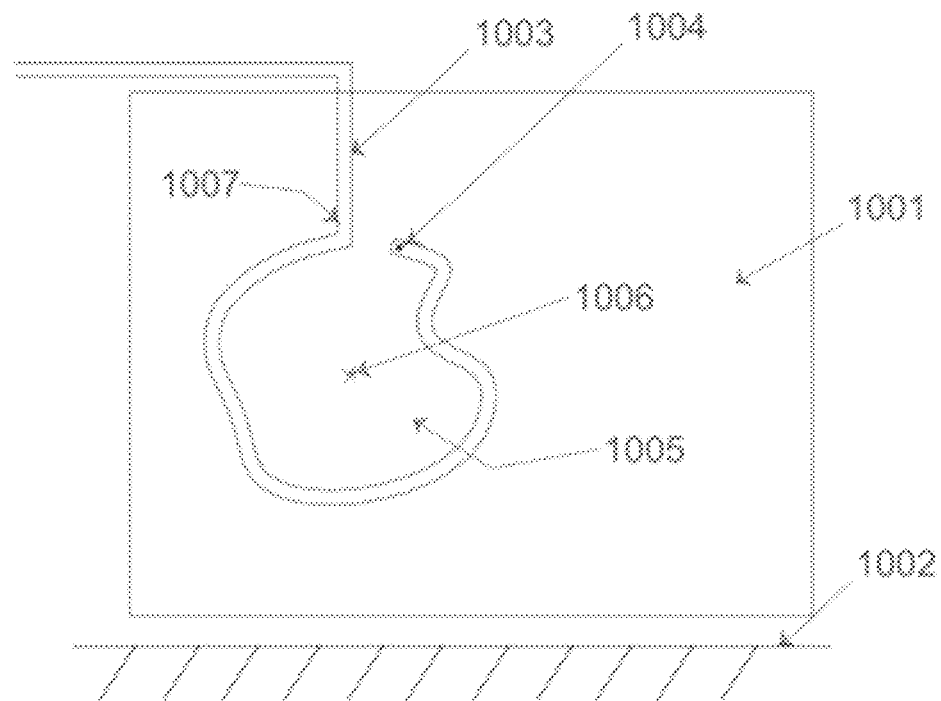
FIG. 10: CNC cutting tool path Start point selection.

FIG. 10 shows as block of material 1001, resting on ground 1002, with material 1001 being cut with a tool 1004, along path 1003.

1005 is the part being cut, which will separate from 1001 at the end of cut.

1006 is the Center of Gravity point of the part 1005.

1007 is the cut start point and also the eventual cut end point.

Figure 11:
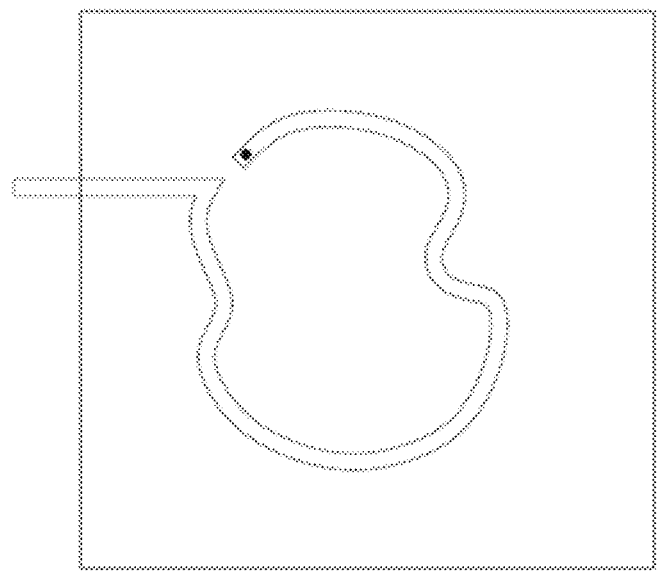
FIG. 11: CNC cutting start point not on top of COG and cutting CCW

FIG. 11 shows a scenario, where the cutting start point is not above the Center of Gravity 1006 of the part being cut. In this scenario, the part will tilt, when end of cut is approaching, because of self-weight. Because of this tilt, the part tends to tear away from the raw material 1001, even before the tool reaches the end of cut. This leaves extra uncut material on the part and end finish is not good.

Figure 12:
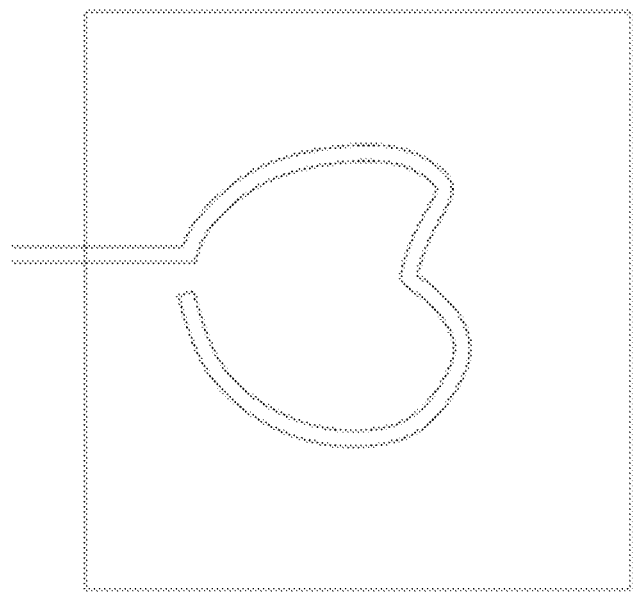
FIG. 12: CNC cutting start point not on top of COG and cutting CW

FIG. 12 shows a scenario, where the cutting start point is not above the Center of Gravity 1006 of the part being cut. In this scenario, the part will tilt, when end of cut is approaching, because of self-weight. Because of this tilt, the part tends to fall on the cutting tool/wire, resulting in extra undesired cuts on the part.

The above two defects can be minimized, if cutting start point 1007 is automatically chosen to be above the center of gravity (COG) 1006 of the part 1005 being cut, as shown in FIG. 10. Or the start point can be chosen at an offset distance of half kerf width (along the path), from the point directly above the COG point. There can also be an additional user chosen offset.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

I claim:

1. An abrasive wire cutting machine (100), which is a subset of CNC wire cutting systems (100), comprising: cutting wire (101), cutting block (102), with pulleys (104), (105), (106), (107), with one of them attached to a motor and other 3 being idler pulleys, moving the wire at high speeds, with all the four pulleys locked to a frame 115 either rigidly or floating on Linear motion rails, with one of the top pulleys on Linear Motion rails (110), (110a) and pushed by a spring loaded linear actuator (112) for maintaining wire tension, and the bottom idler pulley (107) is on a horizontal LM rail Block system (113, 113A, 114), such that distance between bottom pulleys (104), (107) can be adjusted by the user, thus increasing or decreasing effective cutting wire unsupported length (201), allowing user to keep shorter wire unsupported length, when width of block (102) is thinner, which reduces deflection of the cutting wire (101) due to cutting forces.

2. The abrasive wire cutting machine (100A) of claim 1, where the distance adjustment between (104) and (107) is motorized, with a locking provision to lock the pulley in place to the frame 115 after distance adjustment.

3. The abrasive wire cutting machine (100) of claim 1, where the distance reduction between (104) and (107) is compensated by increasing distance between pulley (106) & pulley (107) by moving pulley (106) up, such that overall effective length of cutting wire (101) is same and can be maintained under tension by the same 4 pulleys.

4. The abrasive wire cutting machine (100A) of claim 1, where the distance reduction between (104) and (107) is compensated by using a cutting wire (101A) of shorter length such that the cutting wire (101A) can be maintained under tension by the same 4 pulleys.

5. The abrasive wire cutting machine (100) of claim 1, wherea a 5th pulley (301) can be optionally added to reduce the effective cutting wire unsupported length (201) of the cutting wire (101).

6. A hotwire cutting machine (400), which is a subset of CNC wire cutting systems (100) of claim 1, consisting of one or more wires (401), held on both ends by springs (403), with the wire moving over a grooved rods (402), (402A), which is mounted on blocks (404), (404A), where one of the blocks (404A) is mounted on LM rail blocks (408), (409) such that distance between grooved rods (402), (402A) can be adjusted, based on the width of the block being cut by the wire, with a locking provision through bolts (410) to lock the position of (404A) after distance adjustment.

7. The abrasive wire cutting machine (100A) of claim 1, where the machine is programmed to cut faster (FY) in vertical direction, where deflected wire will not touch the rims and cut slower (Fx) in horizontal direction, where deflected wire can easily touch the rims of the pulleys (104), (107) causing damage to pulley and the wire where Fx Fy are entered by the machine operator as input to the machine.

8. As The automatic method of generating Gcode for the Abrasive wire cutting machine (100A) of claim 7, which computes the federate of cut for each gcode line based on the angle of cut by the formulae: F1=Fx/cos (theta), F1=Fy/sin (theta), [C] chosen feed rate along the path (Fpath)=min (F1, F2), where theta is angle between Gcode line and X-axis and Fx, Fy are the max allowed feed rates in X and Y direction respectively, which allows higher speeds in Y direction and slower speeds in X direction, as per user settings.

9. The CNC wire cutting machine (100) of claim 1, fitting with 3D sensor (906) consisting of camera (905) and LINE LASER (904) to detect wire lag in 360 deg, where user is allowed to set maximum allowed deflection value independently for X and Y, thus achieving overall higher throughput.

10. The CNC wire cutting machine (100) of claim 1, fitted with sensor (906) to detect wire lag, where feed forward information of the path is used to cut faster in the long move zones, between sharp corners, automatically.

11. The CNC wire cutting machine (100) of claim 1, fitted with sensor (906) to detect wire lag, where machine dwells at the corner, till lag is within allowed range, as detected by the sensor (906).

12. The CNC wire cutting machine (100) of claim 1, fitted with sensor (906) to detect wire lag, where the sensor is also programmed for detecting wire vibration, based on LASER beam spot size seen by the camera and to estimate Direction of vibration of wire (101) based on the direction of elongation of the spot size and to alert the operator in case of excessive vibrations.

13. An automatic method of selecting start point (1007) of cut in a CNC wire cutting machine (100) of claim 1 such that the start or pierce point (1007) is automatically selected to be directly above the computed center of gravity point (1006) of the part (1005) being cut, thus ensuring the part (1005) being cut doesn't twist and fall excessively on the cutting tool, which can damage the part (1005) being cut.

* * * * *